(12) United States Patent
Fienup

(10) Patent No.: US 6,597,304 B2
(45) Date of Patent: Jul. 22, 2003

(54) SYSTEM AND METHOD FOR COHERENT ARRAY ABERRATION SENSING

(75) Inventor: James R. Fienup, Ann Arbor, MI (US)

(73) Assignee: Veridian ERIM International, Inc., Ann Arbor, MI (US)

( * ) Notice: Subject to any disclaimer, the term of this patent is extended or adjusted under 35 U.S.C. 154(b) by 25 days.

(21) Appl. No.: 09/916,422

(22) Filed: Jul. 27, 2001

(65) Prior Publication Data

US 2003/0020648 A1 Jan. 30, 2003

(51) Int. Cl.[7] .............................................. G01S 13/89
(52) U.S. Cl. .................... 342/25; 342/159; 342/161; 342/162; 342/191; 342/194
(58) Field of Search .............................. 312/25, 59, 60, 312/77, 83, 127–132, 159, 161, 162, 191, 194

(56) References Cited

U.S. PATENT DOCUMENTS

| | | | | | |
|---|---|---|---|---|---|
| 4,068,234 | A | * | 1/1978 | O'Meara | 342/179 |
| 4,134,113 | A | * | 1/1979 | Powell | 342/25 |
| 5,132,693 | A | * | 7/1992 | Werp | 342/179 |
| 5,469,167 | A | * | 11/1995 | Polge et al. | 342/194 |
| 5,610,610 | A | * | 3/1997 | Hudson et al. | 342/25 |
| 5,745,069 | A | * | 4/1998 | Gail | 342/25 |
| 5,943,006 | A | * | 8/1999 | Crane et al. | 342/196 |
| 6,027,447 | A | * | 2/2000 | Li | 600/447 |
| 6,154,174 | A | | 11/2000 | Snider et al. | |
| 6,204,799 | B1 | * | 3/2001 | Caputi, Jr. | 342/162 |
| 2002/0021240 | A1 | * | 2/2002 | Elam | 342/189 |

OTHER PUBLICATIONS

Richard A. Hutchin, "Sheared Coherent Interferometric Photography A Technique for Lensless Imaging" Optical Physics Consulting (SPIE vol. 2029 Digital Image Recovery & Synthesis II (1993).

Peter Nisenson, "Speckle Imaging with the PAPA Detector and the Knox–Thompson Algorithm", Harvard–Smithsonian Center for Astrophysics (Prepint Series No. 2736, appearing in Proceedings of the NATO Advanced Study Institute, Cargese, France, Sep. 13–23, 1988.

Richard W. Larson et al., "A Microwave Hologram Radar system", IEEE Transactions on Aerospace and Electronic Systems (vol. AES–8, No. 2 Mar. 1972).

* cited by examiner

Primary Examiner—Thomas H. Tarcza
Assistant Examiner—Isam Alsomiri
(74) Attorney, Agent, or Firm—Brooks & Kushman P.C.

(57) ABSTRACT

A system and method for sensing phase errors in a multiple receiver array use three non-collinear transmitters transmitting first, second, and third signals to a target and receiving corresponding signals reflected from the target using the multiple receiver array. In one embodiment, each transmitter transmits a characteristic signal which can be distinguished from each other by the receivers. In one embodiment, each transmitter transmits a slightly different monotone frequency that is preferably outside any imaging bandwidth. The sheared products computed from heterodyne measurements at the receivers in the array based on the reflected signals from the three transmitters are used to determine and correct for the combined transmitter/receiver phase errors at each of the receivers in the array.

32 Claims, 2 Drawing Sheets

SYSTEM AND METHOD FOR COHERENT ARRAY ABERRATION SENSING

This invention is based upon work supported by subcontract H818901 awarded by General Atomics of San Diego, Calif., under prime contract DAAL01-98-C-0068 awarded by the Army Research Laboratory with sponsorship by the Defense Advanced Research Projects Agency (DARPA). The U.S. Government may have certain rights to the invention.

BACKGROUND OF THE INVENTION

1. Field of the Invention

The present invention relates to a system and method for detecting and correcting phase errors associated with a coherent array.

2. Background Art

Various applications use a coherent array of receivers to detect radiation emitted from a target or scene. The radiation detected by the coherent array can be processed to provide information about the target, such as range information, or to form a two-dimensional or three-dimensional image, for example. Receiver arrays may be used for sensing passive radiation reflected from a target object and for active sensing where a scene or target is illuminated using a known source of radiation, such as a microwave or ultrasound beam. Receiver arrays may be used in diverse applications which employ interferometric, synthetic aperture radar (SAR), or phased-array radar sensors to detect emitted radiation, which applications may include surveillance and reconnaissance, target identification and tracking, or medical applications, for example.

The ultimate accuracy or resolution provided by a particular system employing a coherent array of receivers may be affected by many factors. Phase errors, which may be caused by physical changes of individual receivers in the array, motion of the transmitter(s) and/or receiver array, path propagation delays, electronic propagation delays, etc., may result in undesirable effects, such as blurring. A number of strategies have been developed to detect and/or correct phase errors, many of which depend upon some a priori knowledge or assumptions relative to the target or scene. For example, in correcting phase errors in synthetic-aperture radar (SAR), prominent points in the image may be used to determine the phase errors, as described in W. G. Carrara, R. S. Goodman, and R. M. Majewski, *Spotlight Synthetic Aperture Radar Signal Processing Algorithms* (Artech House, Boston, 1995), Chapter 6. Another approach for correcting phase errors due to receiver array motion in a interferometric imaging system used in surveillance and reconnaissance uses strain gauges, inertial measurement units, and various focusing algorithms to measure and to compensate for wing flexure and altitude variations of an aerial vehicle as described in U.S. Pat. No. 6,154,174.

A different function is performed by an approach described by R. A. Hutchin in "Sheared Coherent Interferometric Photography: A Technique for Lensless Imaging" in Digital Image Recovery and Systhesis II, Proc. SPIE 2029, 161–1685 (1993). That approach eliminates the effect of phase errors on a two-dimensional image based on intensity measurements by a receiver array without measuring the phase errors. This is accomplished by using a set of three laser transmitters and detecting at the receiver the interference between signals from pairs of the transmitters.

SUMMARY OF THE INVENTION

It is an object of the present invention to provide a system and method for measuring phase errors in multiple-antenna coherent imaging systems.

Another object of the present invention is to provide a system and method for measuring deformation of a surface having an array of receivers.

A further object of the present invention is to provide a system and method for detecting and correcting coherent array aberration which can be applied to interferometric sensors, synthetic aperture radar sensors, and other phased-array coherent imaging systems.

A still further object of the present invention is to provide a non-mechanical means of measuring and correcting phase errors of a coherent receiver array.

Another object of the present invention is to provide a system and method for sensing aberrations of an array of receivers due to unknown motion of the array or propagation delays.

An additional object of the present invention is to provide a method for correcting physical distortions of a receiver array.

In carrying out the above objects and other objects, features, and advantages of the present invention, a system and method for sensing phase errors in a multiple receiver array include transmitting first, second, and third signals from non-collinear transmitters to a target, measuring amplitude and phase of signals reflected from the target corresponding to the first, second, and third signals using the multiple receiver array, computing a first sheared product of the received signals corresponding to the first and second transmitted signals representing information about phase error variations along a first dimension, computing a second sheared product of the received signals corresponding to the first and third transmitted signals representing information about phase error variations along a second dimension, and determining the phase error associated with each receiver in the multiple receiver array based on the sheared products. In one embodiment, phase errors associated with the non-collinear transmitters are measured and subtracted prior to determining the phase error associated with each receiver in the array. In another embodiment, the non-collinear transmitters are mounted such that they all experience the same phase error. The three non-collinear transmitters may be distinguished from the imaging signals received from the receiver array by using three different frequencies or signal modulations outside the imaging bandwidth.

The present invention provides a number of advantages. For example, the present invention provides a light-weight, inexpensive system for measuring and correcting phase errors in multiple antenna coherent imaging systems. The present invention compensates for aberrations caused by a variety of sources including unknown motion of the array, propagation path errors, and/or electronic phase errors. Once sensed using the present invention, aberrations can be subtracted and thereby corrected. Alternatively, aberration information can be used for real-time physical/mechanical correction of a distorted receiver array. For surveillance and reconnaissance applications, the present invention eliminates the need for phase error measurement and associated inertial measurement units at each receiver. Furthermore, the present invention can also be used with interferometric, SAR, and other phased-array coherent imaging sensors with applications in phased-array radars and medical ultrasound, for example.

The above advantages and other advantages, objects, and features of the present invention, will be readily apparent from the following detailed description of the best mode for carrying out the invention when taken in connection with the accompanying drawings.

DETAILED DESCRIPTION OF THE PREFERRED EMBODIMENT(S)

Figure 1:
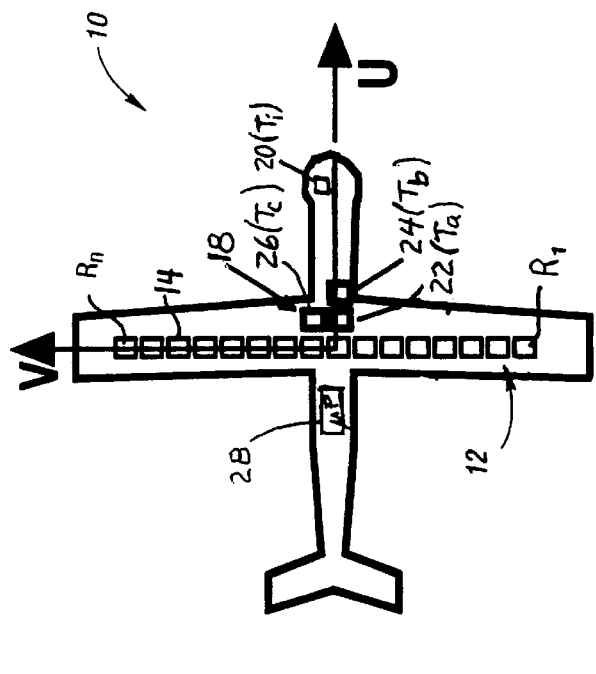
FIG. 1 is a block diagram illustrating operation of a representative system for sensing phase errors according to one embodiment of the present invention.
Figure 1:
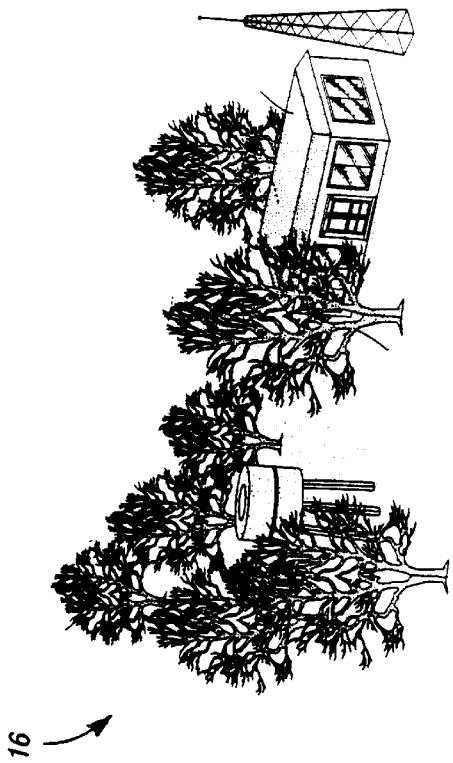

Referring now to FIG. 1, a block diagram illustrating operation of a representative system for sensing and correcting phase errors according to one embodiment of the present invention is shown. While the embodiments illustrated and described generally refer to imaging systems, the present invention may be used in a variety of remote sensing applications having a coherent antenna or receiver array to detect reflected radiation from a target or scene that process the signals to gather information about the target. The present invention may be used to improve the quality of the information by sensing and correcting for phase errors which may be attributed to any of a number of causes. Those of ordinary skill in the art will recognize various other applications for the present invention, such as detecting and/or correcting physical/mechanical distortions of a surface or in an antenna array or correcting phase errors due to propagation through an inhomogeneous media.

System 10 includes a coherent array 12 having a plurality of antenna or receiver elements 14. Receiver elements 14 are preferably substantially evenly spaced and collinear. Array 12 is used to detect or sense radiation reflected from a target or scene 16, which may be passive radiation or radiation generated by one or more motion sensing transmitters, indicated generally by reference numeral 18. In one embodiment, array 12 and motion sensing transmitters 18 move across target or scene 16 at some desired or measured velocity and distance or altitude while transmiting pulsed signals with reflected radiation from array 12 used to generate a three-dimensional image of target or scene 16. For example, in a surveillance or reconnaissance application, system 10 may be positioned on an aerial vehicle which traverses a scene. In another application, system 10 may be positioned within a wand or sensor which is moved across target or scene 16, such as used in medical imaging applications. Alternatively, system 10 may remain stationary with target 16 moving across its field of view.

Motion sensing transmitters 18 may be used alone with array 12 for passive sensor applications. For active sensor applications, system 10 preferably includes at least one imaging transmitter or antenna 20 which transmits within an imaging bandwidth, which may depend upon the particular application, to remotely sense information about target or scene 16. According to the present invention, motion sensing transmitters 18 include two or three transmitters 22, 24, and 26 which transmit signals used to measure and correct phase errors of receivers 14 on array 12. A common transmitter, such as imaging transmitter 20, could be used for both imaging and for motion sensing, with only two additional motion sensing transmitters. If a common transmitter is used, it should preferably be located close to the other motion sensing transmitters with spacing as described below. Operation of the present invention is described herein using three separate motion sensing transmitters for convenience and simplicity.

For active sensor antenna applications, unknown radial motions of system 10 relative to scene or target 16 by a distance $\Delta r$, cause phase errors of $\phi_e = 2\pi\Delta r/\lambda$ where $\lambda$ represents the wavelength of the imaging signal transmitted by transmitter 20. If transmitter 20 and a receiver 14 in array 12 both experience the same $\Delta r$, then the total phase error is $4\pi\Delta r/\lambda$. For diffraction-limited, good-quality imagery without noticeable smearing, $\Delta r$ (peak-to-valley) should be less than $\lambda/4$, or $\Delta r_{rms} < \lambda/14$. Because linear phase errors only translate the image and can be accounted for using known techniques, they are not specifically addressed herein.

Undesirable motion of receivers 14 in coherent array 12 can be measured and compensated using a number of different techniques depending upon the particular application. For example, in imaging applications having system 10 mounted on an aerial vehicle, the combination of global positioning sensors (GPSs) and inertial measurement units (IMUs) to form an inertial navigation sensor (INS) may provide most of the necessary motion compensation for a conventional synthetic aperture radar (SAR). However, as the number of receiver or antenna elements 14 in coherent array 12 increases, each potentially having a slightly different motion, this approach becomes too complicated and expensive.

As an alternative approach according to the present invention, means for measuring phase errors associated with one or more of the transmitters 18, such as an INS, may be used since only one, or at most four, would be required. As described in greater detail below, if the transmitters used in detecting and correcting phase errors are rigidly mounted such that they all experience the same phase error, an estimate of the combined phase error between a transmitter and the receivers can be obtained without measuring the phase error of the transmitters.

For determining the motion of array 12 of receiver antennas 14 and the resulting phase errors (in addition to phase errors caused by other factors described below), the present invention uses three non-collinear transmitters 22, 24, 26 in combination with coherent array 12. FIG. 1 depicts one potential arrangement for the motion sensing transmitters 18 relative to coherent array 12. As previously indicated, one of the three transmitters 22, 24, or 26 could be the same transmitter 20 used for imaging, if desired. Likewise, the transmitters need not be in any particular proximity or relationship to coherent array 14 although they should be non-collinear. Transmitters 22, 24, and 26 are preferably arranged as illustrated with two transmitters 22, 24 arranged substantially perpendicular to array 12 with the third transmitter 26 substantially parallel to array 12. To simplify the computational complexity, the first and third transmitters 22, 26 are preferably spaced a distance corresponding to the distance between any two receivers 14 of the multiple receiver array 12. Likewise, the first and second transmitters 22, 24 are preferably spaced a distance corresponding to an integer number times twice the distance the multiple receiver array 12 moves between successive pulses of the transmitted signals.

With continuing reference to FIG. 1, suppose that at time $t=0$ a pulse is transmitted (of duration some fraction of a millisecond) at a constant frequency from one of the motion sensing transmitters 18, such as transmitter 22 ($T_a$) using a signal characteristic which may be used to associate the pulse with the transmitter. The signal characteristic may be a particular signal modulation or a constant frequency $\omega_a$, for example. The radiation or signal reflected from target or scene 16 is received by receivers 14, which are preferably equally spaced at locations $(u, v) = (0, n\Delta v)$ in the "u,v"

coordinate system of system 10 as illustrated in FIG. 1. At times t=m τ, m=0, ..., M−1, the heterodyne measurements (amplitude and phase) of receivers 14 are captured and stored by computer 28, thereby sweeping out the 2-D field reflected by target or scene 16. If adequately sampled heterodyne measurements are made and there were no phase errors, then the received field data could be processed using Fourier transform techniques to compute a coherent 2-D angle-angle image of the scene. In practice, however, there will be phase errors due to unknown motion of receivers 14. For the $m^{th}$ pulse, let the phase error on transmitter 22 be represented by $\phi_{am}$ and the phase error on the $n^{th}$ receiver in array 12 be represented by $\phi_{mn}$. The field measurements at the $n^{th}$ receiver attributable to transmitter 22 could then be generally represented by:

$$G_{amn} = F_{mn} \exp[i(\phi_{mn} + \phi_{am})] \tag{1}$$

where $F_{mn}$ represent the ideal complex field measurements without phase errors (ignoring noise). The phase error $\phi_{mn}$ is fully two-dimensional and is not separable. To obtain an unblurred image, the total phase error $(\phi_{mn}+\phi_{am})$ needs to be determined and corrected.

Transmitters 24 ($T_b$) and 26 ($T_c$), which have associated phase errors $\phi_{bm}$ and $\phi_{cm}$, respectively, and frequencies $\omega_b$ and $\omega_c$, respectively simultaneously illuminate target or scene 16. Preferably, the identifiable signal characteristic (frequency, signal modulation, etc.) is selected such that the three fields are separable at the receiver. For example, where different frequencies are used, the difference in frequencies is chosen to be large enough to electronically separate the three fields at the receiver. For simplicity in describing the present invention and for reducing computational complexity in actual applications, the position of transmitter 24 is preferably an integer number times twice the relative velocity between system 10 and target or scene 16. Stated differently, transmitter 24 is preferably positioned up $v_{pt}/2$ ahead of transmitter 22. Selection of this spacing shifts the field one sample ahead. Also for simplicity, transmitter 26 is preferably separated from transmitter 22 by a distance equal to the separation between any two of the receivers 14. The field (heterodyne) measurements detected by receivers 14 that originate from the transmitter 24 will be given by:

$$G_{bmn} = F_{m+1,n} \exp[i(\phi_{mn} + \phi_{bm})]. \tag{2}$$

That is, the field F will shift one sample over receivers 14, but the phase errors are the same (for the same received pulse, the $m^{th}$ pulse). Similarly, the field measurements detected by receivers 14 that originate from transmitter 26 will be given by:

$$G_{cmn} = F_{m,n+1} \exp[i(\phi_{mn} + \phi_{cm})], \tag{3}$$

where again the field shifts (along array 12 in this case) but the phase errors do not. Computing the product between the signal from transmitter 22 and the complex conjugate of the signal from transmitter 24 delayed or translated by an appropriate amount is represented by:

$$G_{amn}G^*_{bm-1,n} = |F_{mn}|^2 \exp[i(\phi_{mn} - \phi_{m-1,n} + \phi_{am} - \phi_{bm-1})]. \tag{4}$$

This first sheared product, computed from measured quantities, contains information about how the phase error varies along a first dimension, time (m) in this example. The phase of the field itself, $F_{mn}$, is canceled. Computing a similar sheared product for the first and third transmitters 22, 26:

$$G_{amn}G^*_{cm,n-1} = |F_{mn}|^2 \exp[i(\phi_{mn} - \phi_{m,n-1} + \phi_{am} - \phi_{cm})]. \tag{5}$$

This second sheared product contains information about how the receiver phase error varies along a second dimension (n), e.g. along array 12.

In one embodiment of the present invention, the phase errors $\phi_{am}$, $\phi_{bm}$, and $\phi_{cm}$ are measured using appropriate means depending upon the particular application. For example, inertial measurement units (IMU's) may be used on the three transmitters 22, 24, and 26, thereby measuring $\phi_{am}$, $\phi_{bm}$, and $\phi_{cm}$. The phase errors may then be subtracted from corresponding terms of the first and second sheared products to generate finite difference expressions of the phase error $\phi_{mn}$ in the two directions or dimensions. These finite difference expressions are then solved over the entire array preferably using a complex-phasor reconstruction algorithm to determine $\phi_{mn}$ such as described by P. Nisenson, "Speckle Imaging with the PAPA Detector and the Knox-Thompson Algorithm," in D. M. Alloin and J. -M. Mariotti, eds., *Diffraction-Limited Imaging*, Sept. 13–23, 1988 (Kluwer Academic Publishers, Boston, 1989), pp. 157–169, for example. The complex-phasor reconstructor solves over the entire array in a least-squares fashion and takes care of problems with phase branch cuts. The approach of the present invention is similar to an approach for image reconstruction through atmospheric turbulence, as described in R. A. Hutchin, "Sheared Coherent Interferometric Photography: A Technique for Lensless Imaging" in Digital Image Recovery and Synthesis II, Proc. SPIE 2029, 161–168 5 (1993), but the present invention reverses the roles of the phase due to the target or scene reflectivity and the phase due to the aberrations.

An alternative to having three IMU's (one for each transmitter) is, since the three transmitters are preferably physically close to one another, to rigidly mount them all together, so that they all experience the same phase error: $\phi_{am}=\phi_{bm}=\phi_{cm}$. This would be true if the only significant source of the phase error on the transmitters was altitude or height variation between system 10 and target or scene 16. This would not be true, however, for roll or for pitch of system 10. However, if roll and pitch are measured by a common IMU, for example, then that effect can be backed out.

When $\phi_{am}=\phi_{bm}=\phi_{cm}$, then from the equations above we see that the phase of the second sheared product, $G_{amn}G^*_{cm,n-1}$, is $\phi_{mn}-\phi_{m,n+1}$, where the phase error due to transmitters 22 and 26 have canceled. This provides information about the phase error in the direction of array 12. However, from the first sheared product, the phases $\phi_{am}-\phi_{bm-1} \approx \phi_{am}-\phi_{am-1}$ from transmitters 22 and 24 do not cancel. Nevertheless, the phase of $G_{amn}G^*_{bm-1,n}$, namely $$\arg[G_{amn}G^*_{bm-1,n}] = \phi_{mn} - \phi_{m-1,n} + \phi_{am} - \phi_{am-1} \tag{6}$$

$$= (\phi_{mn} + \phi_{am}) - (\phi_{m-1,n} - \phi_{am-1}),$$

is the finite difference in the total phase error $(\phi_{mn}+\phi_{am})$ from both the receiver and the transmitter (modulo $2\pi$). The product $G_{amn}G^*_{cm,n-1}$ can be thought of as being an orthogonal shear of the same total phase error, except that its shear happens to cancel the $\phi_{am}$ term, and so that term does not appear explicitly in the equation for $G_{amn}G^*_{cm,n-1}$. Hence, when the values for $G_{amn}G^*_{bm-1,n}$ and $G_{amn}G^*_{cm,n-1}$ are used in the phasor reconstructor, the output is an estimate of the total phase error $(\phi_{mn}+\phi_{am})$. Thus, in the absence of noise and with $\phi_{am}=\phi_{bm}=\phi_{cm}$, a perfect reconstruction of the phase is obtainable.

For the case of an unknown pitch, $\phi_{am}=\phi_{cm}\neq\phi_{bm}$, a residual phase error results in the along-track direction or direction of movement of system 10 relative to target or scene 16. An initial phase estimate may be determined using the phasor reconstructor, assuming $\phi_{am}-\phi_{bm-1}=0$, with the residual error in the resulting reconstruction being a function of m only. This initial phase estimate can be refined to account for the fact that $\phi_{am}-\phi_{bm-1}\neq 0$ using conventional focusing algorithms which work well on one-dimensional phase errors.

For the case where both roll and pitch are present, $\phi_{am}\neq\phi_{cm}\neq\phi_{bm}$, and a two-dimensional residual phase error would result from the phasor reconstructor. For this kind of phase error, conventional autofocus approaches do not work so it would be important to measure the phase errors of the transmitters to correct this source of error. Several other effects may result in one-dimensional and two-dimensional residual phase errors including noise and errors in knowledge of the forward velocity of the system. However, these residual phase errors can often be tolerated and maintained at an acceptable level for a particular application by managing received signal to noise ratio, accurately measuring forward velocity, and accurately measuring roll and pitch. In addition, where frequency is used as the identifying characteristic to associate a transmitted signal with a particular transmitter, the frequency difference and span should be selected appropriately based on system requirements and should be outside the band used for imaging as described with reference to FIG. 2 to avoid any undesirable interactions with the imaging system, if any.

Figure 2:
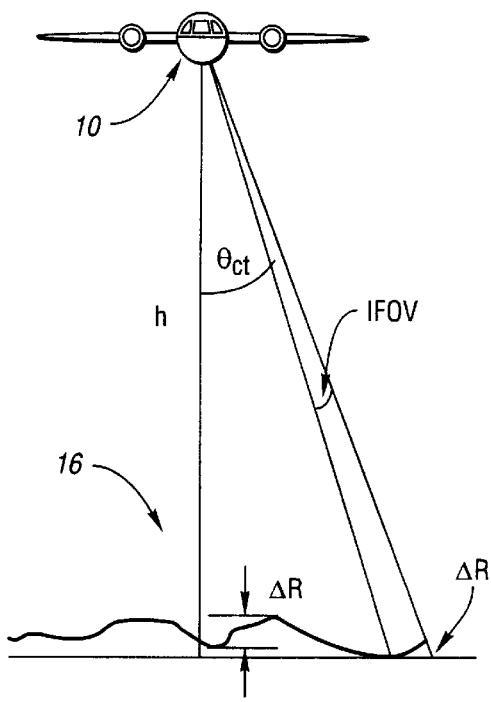
FIG. 2 illustrates considerations for determining frequencies for transmitters according to one embodiment of the present invention.

A diagram illustrating various considerations for determining frequencies for the motion compensation transmitters according to one embodiment of the present invention is shown in FIG. 2. Selection of the transmitting frequencies is generally governed by two constraints. First, the frequency difference among the three transmitters should exceed that due to Doppler shift differences resulting from motion of the system for different points on the target or scene within the instantaneous field of view (IFOV). For an along-track angle (relative to nadir) of $\theta_{at}$, the frequency difference between any two of the three transmitters should be $\Delta f > f_c(v_p/c)2 \sin \theta_{at}$ where $v_p$ represents the velocity of the system in the along-track direction, $f_c$ represents the median signal frequency of the three transmitters, and c is the speed of light. Second, the frequency difference should be less than that for which the field changes significantly as determined by the depth $\Delta R$ of the scene: $\Delta f < c/2\Delta R$. This is similar to the ambiguous range interval calculation. Even for a flat scene, it will have a depth as seen from the system given by:

$$\Delta R = h[\sec\theta_{ct} - \sec(\theta_{ct}-IFOV)] \approx h\theta_{cT}IFOV$$

as can be determined by the geometry shown in FIG. 2. In one representative application using millimeter wave (94 GHz) three-dimensional SAR imaging in an aerial vehicle traveling at 50 m/s with an IFOV of 0.044 rad and $\Delta R$ of 35 m, the three distinct frequencies should differ by at least 30 kHz, to accommodate the Doppler spread, with the span limited to less than 1 MHz to accommodate the depth of the scene, and the frequencies should also be outside the band used for imaging to minimize interactions with the imaging system.

Figure 3:
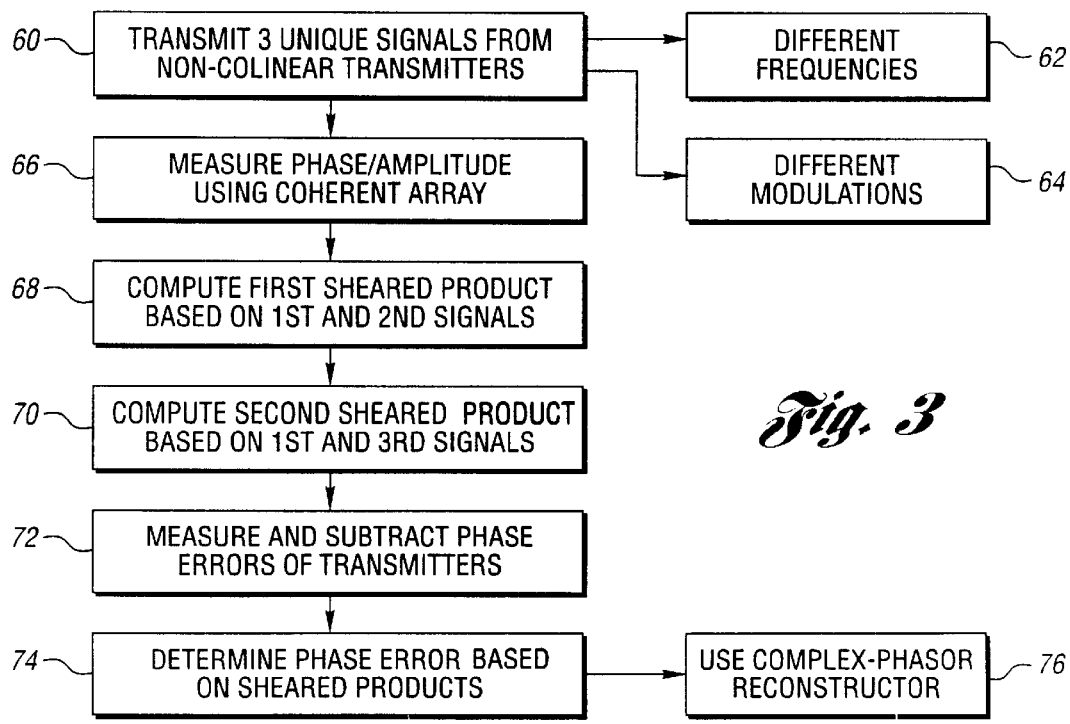
FIG. 3 is a flow chart illustrating operation of a system or method for sensing phase errors according to one embodiment of the present invention.

A flowchart illustrating operation of one embodiment of a system or method for determining phase errors according to the present invention is shown in FIG. 3. As will be appreciated by one of ordinary skill in the art, the flowchart illustrated in FIG. 3 may represent any of a number of known processing strategies which may include event-driven, interrupt-driven, multi-tasking, multi-threading, parallel, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Preferably, control logic as represented in FIG. 3 is implemented primarily in software which is executed by a microprocessor-based computer. Of course, the control logic may be implemented in software, hardware, or a combination of software and hardware. While not explicitly illustrated, one of ordinary skill in the art will recognize that various steps may be performed iteratively.

According to the present invention, first, second, and third signals are transmitted from corresponding first, second, and third non-collinear transmitters as represented by block 60. While one of the transmitters may also transmit a signal used for imaging the target or scene, three transmitters used only for motion compensation are preferred. Preferably, each of the signals includes at least one signal characteristic which allows the signals to be associated with their corresponding transmitter when received by the multiple receiver array. In one embodiment, the signal characteristic is the signal frequency, as represented by block 62, with each signal having a monotone frequency outside the band used for imaging. In another embodiment, the signal characteristic is the signal modulation as represented by block 64.

The phase and amplitude of signals reflected from the target or scene are measured using the coherent array as represented by block 66. These measurements are used in computing a first sheared product of the received signals corresponding to the first and second transmitted signals as indicated by block 68. The first sheared product is the product between the signal from the first transmitter and the complex conjugate of the signal from the second transmitter sheared (delayed or translated) by an appropriate amount. The first sheared product represents information about how the phase error varies along a first dimension or direction. In a similar fashion, a second sheared product is computed based on the first and third transmitted signals as indicated by block 70. The second sheared product represents information about how the phase error varies along a second dimension or direction.

In one embodiment, the optional step represented by block 72 corresponds to measuring phase errors associated with the first, second, and third transmitters and subtracting the phase errors associated with the transmitters from corresponding terms in the sheared products to determine finite difference expressions corresponding to each of the receivers in the multiple receiver array. The finite difference expressions are then solved across all the receivers in the array to determine the phase error associated with each receiver based on the sheared products as represented by block 74. Preferably, the phase error is determined based on the finite difference expressions using a complex-phasor reconstruction algorithm as represented by block 76.

In an alternative embodiment, block 72 is omitted by setting the phase errors associated with the motion compensation transmitters equal to one another to determine an estimate of a combined phase error associated with each transmitter and the receivers in the coherent array.

As such, the present invention provides a light-weight, inexpensive system for measuring and correcting phase errors in multiple-antenna coherent imaging systems. Phase errors or aberrations caused by a variety of sources including unknown motion of the array, propagation path errors, and/or electronic phase errors are compensated. Once sensed using the present invention as described in detail above, aberrations can be subtracted and thereby corrected. Alternatively, aberration information can be used for real-time physical/mechanical correction of a distorted receiver array. For surveillance and reconnaissance applications which may use hundreds of receivers, the present invention eliminates the need for phase error measurement and associated inertial measurement units at each receiver. Furthermore, the present invention can be used with interferometric, SAR, and other phased-array coherent imaging sensors with applications in phased-array radars and medical ultrasound, among others.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for sensing phase errors in a coherent multiple receiver array, the method comprising:

transmitting first, second, and third signals from corresponding first, second, and third non-collinear transmitters to a target or scene;

measuring phase and amplitude of signals reflected from the target or scene corresponding to the first, second, and third transmitted signals received by the multiple receiver array;

computing a first sheared product of the received signals corresponding to the first and second transmitted signals representing information about phase error variations of the multiple receiver array as a function of time;

computing a second sheared product of the received signals corresponding to the first and third transmitted signals representing information about phase error variations of the multiple receiver array as a function of the positions of the receivers along the multiple receiver array; and determining the phase error associated with each receiver in the multiple receiver array based on the first and second sheared products.

2. The method of claim 1 wherein the step of transmitting comprises changing at least one signal characteristic for each of the first, second, and third signals such that each signal may be associated with its corresponding transmitter when received by the multiple receiver array.

3. The method of claim 2 wherein changing at least one signal characteristic comprises changing signal frequency.

4. The method of claim 2 wherein changing at least one signal characteristic comprises changing signal modulation.

5. The method of claim 1 wherein the step of transmitting comprises transmitting at least one signal using a transmitter that also transmits signals used to obtain information about the target or scene.

6. The method of claim 1 further comprising transmitting a signal used for imaging the target or scene from one of the first, second, or third transmitters.

7. The method of claim 1 wherein the first and second transmitters are oriented along a line perpendicular to the receiver array.

8. The method of claim 1 wherein the first and third transmitters are oriented along a line parallel to the receiver array.

9. The method of claim 1 wherein the first and third transmitters are spaced a distance corresponding to distance between any two receivers of the multiple receiver array.

10. The method of claim 1 wherein the signals are pulsed and wherein the first and second transmitters are spaced a distance corresponding to an integer number times twice the distance the multiple receiver array moves between successive pulses.

11. The method of claim 1 further comprising:

measuring phase errors associated with the first, second, and third transmitters; and subtracting the phase errors associated with the first, second, and third transmitters from corresponding terms in the first and second sheared products prior to the step of determining.

12. The method of claim 1 further comprising:

measuring phase errors associated with the first, second, and third transmitters;

subtracting the phase errors associated with the first, second, and third transmitters from corresponding terms in the first and second sheared products to determine a finite difference expression corresponding to each of the receivers in the multiple receiver array; and determining the phase error associated with each receiver in the multiple receiver array using a complex-phasor reconstruction algorithm based on the finite difference expressions.

13. The method of claim 1 wherein the step of determining comprises:

setting phase errors associated with the first, second, and third non-collinear transmitters equal to one another to determine an estimate of a combined phase error associated with each transmitter and the receivers.

14. The method of claim 1 wherein the step of determining comprises:

subtracting the phase errors associated with the first, second, and third transmitters from corresponding terms in the first and second sheared products to determine a finite difference expression corresponding to each of the receivers in the multiple receiver array; and determining the phase error associated with a receiver in the multiple receiver array by solving the finite difference expressions over all the receivers in the multiple receiver array.

15. A system for remotely sensing a target or scene, the system comprising:

first, second, and third non-collinear transmitters each transmitting a signal having at least one identifiable characteristic for associating the signal with its corresponding transmitter;

an array of receivers for measuring phase and amplitude of received signals reflected from the target or scene corresponding to the first, second, and third signals;

a processor in communication with the array of receivers, the processor computing a first sheared product of the received signals corresponding to the first and second transmitted signals representing information about phase error variations of the array of receivers as a function of time, computing a second sheared product of the received signals corresponding to the first and third transmitted signals representing information about phase error variations of the array of receivers as a function of the positions of the receivers, and determining the phase error associated with each receiver in the receiver array based on the first and second sheared products.

16. The system of claim 15 wherein the signals are pulsed and wherein the first and second transmitters are spaced a distance corresponding to an integer number times twice the distance the array moves between successive pulses.

17. A system for remotely sensing a target or scene, the system comprising:

first, second, and third non-collinear transmitters each transmitting a signal having at least one identifiable characteristic for associating the signal with its corresponding transmitter;

an array of receivers for measuring phase and amplitude of received signals reflected from the target or scene corresponding to the first, second, and third signals;

a processor in communication with the array of receivers, the processor computing a first sheared product of the received signals corresponding to the first and second transmitted signals representing information about phase error variations along a first dimension, computing a second sheared product of the received signals corresponding to the first and third transmitted signals representing information about phase error variations along a second dimension, and determining the phase error associated with each receiver in the receiver array based on the first and second sheared products;

wherein the array of receivers travels in a direction substantially perpendicular to the array at a desired velocity and wherein spacing between the first and second transmitters is determined based on the desired velocity.

18. The system of claim 17 wherein the first and third transmitters are aligned substantially parallel with the array of receivers.

19. The system of claim 17 wherein the first and second transmitters are aligned substantially perpendicular to the array of receivers.

20. The system of claim 17 wherein the array of receivers includes a plurality of substantially equally spaced receivers and wherein the first and third transmitters are spaced a distance equal to the space between any two receivers of the array.

21. The system of claim 17 wherein one of the transmitters transmits a first signal used to measure receiver phase errors and a second signal used for imaging or ranging the target or scene.

22. The system of claim 17 wherein the first, second, and third transmitters transmit signals using different signal modulations.

23. The system of claim 17 wherein the first, second, and third transmitters transmit signals at first, second, and third frequencies.

24. The system of claim 23 wherein the first, second, and third frequencies are determined based on depth of the target or scene.

25. The system of claim 23 wherein the first, second, and third frequencies are determined based on a slant angle from the transmitters to the target or scene.

26. The system of claim 17 wherein the first, second, and third transmitters are rigidly mounted to resist movement relative to one another.

27. The system of claim 17 further comprising means for measuring phase errors associated with the transmitters.

28. The system of claim 17 further comprising a plurality of inertial measurement units for measuring phase errors associated with the transmitters.

29. The system of claim 17 further comprising means for measuring phase errors associated with the first, second, and third transmitters, wherein the processor subtracts the phase errors associated with the first, second, and third transmitters from corresponding terms in the first and second sheared products prior to determining the phase errors based on the sheared products.

30. The system of claim 17 wherein the processor:

subtracts the phase errors associated with the first, second, and third transmitters from corresponding terms in the first and second sheared products to determine a finite difference expression corresponding to each of the receivers in the array; and determines the phase error associated with a receiver in the array using a complex-phasor reconstruction algorithm based on the finite difference expressions.

31. The system of claim 17 wherein the processor determines an estimate of a combined phase error associated with the transmitters and each of the receivers based on the phase errors associated with the first, second, and third transmitters being equal to one another without measuring the phase errors of the first, second, and third transmitters.

32. The system of claim 17 wherein the processor:

subtracts the phase errors associated with the first, second, and third transmitters from corresponding terms in the first and second sheared products to determine a finite difference expression corresponding to each of the receivers in the array; and determines the phase error associated with a receiver in the array by solving the finite difference expressions over all the receivers in the array.

* * * * *